UNITED STATES PATENT OFFICE.

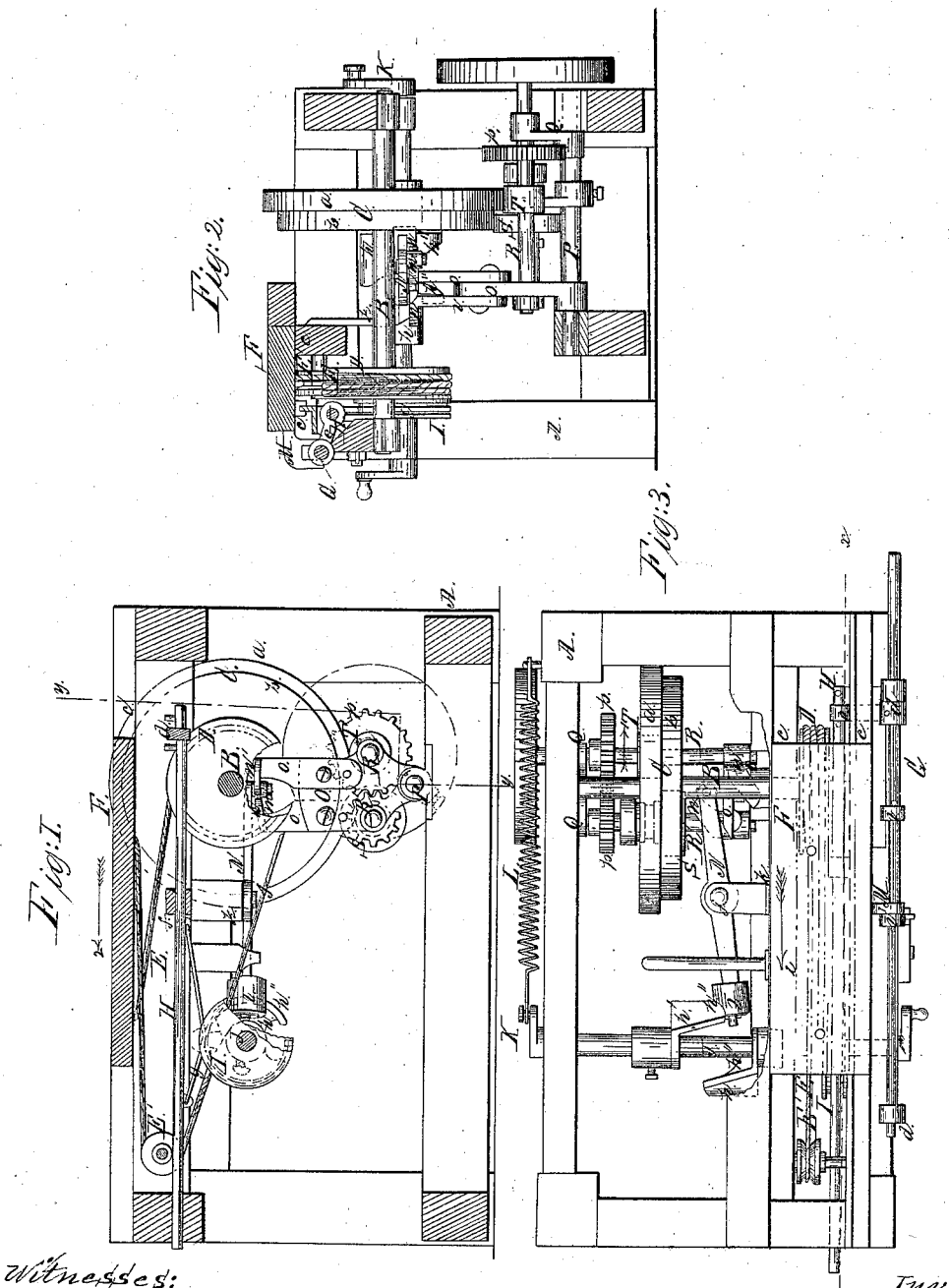

JESSE GILMAN, OF SOUTH MERRIMACK, NEW HAMPSHIRE.

FEEDING AND GIGGING-BACK MOVEMENT IN SAWING-MACHINES.

Specification of Letters Patent No. 32,419, dated May 28, 1861.

*To all whom it may concern:*

Be it known that I, JESSE GILMAN, of South Merrimack, in the county of Hillsboro and State of New Hampshire, have invented a new and useful Improvement in Machines for Sawing Laths, Clapboards, &c.; and I do hereby declare that the following is a full, clear, and exact description of the same, reference being had to the annexed drawings, making a part of this specification, in which—

Figure 1 is a side sectional view of my invention, $x$, $x$ Fig. 3, indicating the plane of section. Fig. 2, a transverse vertical section of the same, taken in the line $y$, $y$, Fig. 1. Fig. 3, a plan or top view of the same.

Similar letters of reference indicate corresponding parts in the several figures.

This invention relates to an improvement on a machine for sawing laths, clapboards, etc., for which Letters Patent were formerly granted to me bearing date March 25th, 1856.

The object of the within described invention is to simplify and perfect the feed and reverse movements of the bolt as hereinafter fully shown and described.

To enable those skilled in the art to fully understand and construct my invention, I will proceed to describe it.

A represents a rectangular framing which may be constructed in any proper way to support the working parts.

B is a shaft, which is placed transversely in the framing and has a pulley C placed in it, said pulley having two different diameters $a$, $b$, the former being greater than the latter as shown clearly in Figs. 2 and 3. On the shaft B there is also placed a pulley D, around which a cord E passes, said cord also passing around a pulley E′ in the framing, the pulleys D, E′, being at opposite ends of the framing as shown in Fig. 1. The ends of the cord E are attached to a bolt carriage F, which is placed on suitable guides or ways $c$, $c$ secured longitudinally on the upper part of the framing.

G is a sliding rod which is fitted in proper bearings $d$ attached to one side of the framing, and this rod G is connected by an arm $e'$ to a rod H, which is fitted in suitable guides $f$. The rod H is connected by a strap $g$ to a pulley I, which is placed on a shaft J in the framing. The shaft J has two cams $h$ $h'$ placed on it, said cams being formed of sections of cylinders their face sides $h''$ being opposite each other and having oblique surfaces, as shown more particularly in Figs. 2 and 3. To one end of the shaft J there is attached a crank K, to which a spring L is connected. The slide rod G has two bosses $i$ $i'$ placed on it and to the outer side of the bolt carriage F there is attached a forked arm M which embraces the rod G between the bosses $i$ $i'$ see Fig. 3.

N is a lever which has its fulcrum $j$ in a pendant $k$ attached to the framing A. On one end of this lever there is placed a friction roller $l$ which is in line with the faces of the cams $h$ $h'$. On the opposite end of the lever there is placed a friction roller $m$, which is between two horizontal arms $n$ $n$ that are at the upper parts of bars $o$ $o$, which bars are attached to a plate O.

The plate O is secured to a rock shaft P, in the framing, said shaft P also having arms Q secured on it, which arms in connection with plate O, form the bearings of two shafts R R′ which are connected at one end by gears $p$, $p$, and to one of which R, the driving power is applied.

On the shaft R′ there is placed a pulley S and a pulley T is placed on shaft R, the latter being less in diameter than the pulley S. The smaller pulley T is in line with the larger diameter $a$ of pulley C, and the pulley S is in line with the smaller diameter $b$ of pulley C as shown clearly in Fig. 2.

The operation of the machine is as follows: The bolt to be sawed is placed on the carriage F, and the shaft R is rotated by any convenient power, in the direction indicated by the arrow 1. When the bolt carriage is feeding the bolt to the saw, the former moves in the direction indicated by arrow 2, see Figs. 1 and 3, and motion is communicated to the bolt carriage through the medium of the smaller pulley T, the larger diameter $a$ of the pulley C and the cord E. As the bolt carriage moves in the direction of arrow 2, the arm M will strike the boss $i'$ and carry the rod G along with it, and also rod H, and the latter will turn the shaft J through the medium of the strap $g$, and pulley I. When the bolt carriage F reaches the termination of its feed movement, the shaft J will have been turned sufficiently to admit of the spring L throwing the shaft J rapidly around about a quarter of a revolution, and cause the cam $h$ to actuate the lever N, the friction roller $m$ of which acts against the arm $n'$ which moves plate O, and throws the larger pulley S in contact with the smaller diameter $b$ of the pulley C. By this arrangement a quick, gigging back movement is given the bolt carriage F. During this gigging back movement of the bolt carriage F, the arm M strikes the boss $i'$ and carries the rods G, H, along with the bolt carriage, the latter turning the shaft J in a direction contrary to its former movement and by the time the bolt carriage reaches the termination of its gigging back movement, the spring L suddenly turns or throws the shaft J, so that the cam $h'$ will again actuate the lever N, but in a direction reverse to its previous movement, which movement causes the roller $m$ to strike arm $n$, and throw the pulley T in contact with the larger diameter $a$ of pulley C, and at the same time throw the pulley S out or free from the larger diameter $a$ of the pulley C. The feed movement then again commences. Thus an automatic reciprocating movement is given the bolt carriage, a slow feed movement and a comparatively quick gigging back movement.

Having thus described my invention, what I claim as new and desire to secure by Letters Patent is—

The combination of the double peripheried pulley C, and pulleys S, T, with each other and with the movable shafts R, R', lever N, cams $h$, $h'$, carriage F, and rods G, H, all in the manner and for the purpose herein shown and described.

JESSE GILMAN.

Witnesses:
H. F. RICHMOND,
GEO. Y. SAWYER.